US012664214B2

(12) United States Patent
Tran et al.

(10) Patent No.: US 12,664,214 B2
(45) Date of Patent: Jun. 23, 2026

(54) SYSTEMS AND METHODS FOR AUTOMATIC GENERATION OF SOCIAL MEDIA NETWORKS AND INTERACTIONS

(71) Applicant: IDS Technology LLC, Arlington, VA (US)

(72) Inventors: Tung Thanh Tran, Bradenton, FL (US); Dongwook Shin, Potomac, MD (US)

(73) Assignee: IDS TECHNOLOGY LLC, Arlington, VA (US)

(*) Notice: Subject to any disclaimer, the term of this patent is extended or adjusted under 35 U.S.C. 154(b) by 0 days.

(21) Appl. No.: 17/825,584

(22) Filed: May 26, 2022

(65) Prior Publication Data

US 2022/0393949 A1      Dec. 8, 2022

Related U.S. Application Data

(60) Provisional application No. 63/193,180, filed on May 26, 2021.

(51) Int. Cl.
*H04L 41/14*          (2022.01)
*G06F 16/9536*        (2019.01)
(Continued)

(52) U.S. Cl.
CPC ........... *H04L 41/145* (2013.01); *G06Q 50/01* (2013.01); *H04L 41/12* (2013.01); *G06F 16/9536* (2019.01); *H04L 51/52* (2022.05)

(58) Field of Classification Search
None
See application file for complete search history.

(56) References Cited

U.S. PATENT DOCUMENTS 6,961,055 B2    11/2005  Doak et al.
9,070,101 B2     6/2015  Abhyanker
(Continued)

FOREIGN PATENT DOCUMENTS

CN          106650915 A      5/2017
WO      2019005734 A1      1/2019

OTHER PUBLICATIONS

Reddit Topic "How do you approach other YouTubers about collaborating?" retrieved from URL: https://www.reddit.com/r/NewTubers/comments/bwzykg/how_do_you_approach_other_youtubers_about/ (Year: 2019).*

(Continued)

*Primary Examiner* — Schquita D Goodwin
*Assistant Examiner* — Ishrat Rashid
(74) *Attorney, Agent, or Firm* — Brian J. Colandreo; Heath M. Sargeant; Holland & Knight LLP

(57)          ABSTRACT

A method, computer program product, and computer system for identifying, by a computing device, a first agent on a 2-dimensional plane. A second agent on the 2-dimensional plane may be identified. The first agent and the second agent may follow a set of travel rules that dictate a travel loop between a respective home and a respective target for the first agent and the second agent. The first agent and the second agent may follow a set of collision rules for the first agent and the second agent. A social network may be simulated based upon, at least in part, the set of travel rules and the set of collision rules for the first agent and the second agent.

21 Claims, 7 Drawing Sheets

10

(51) Int. Cl.
    *G06Q 50/00*     (2024.01)
    *H04L 41/12*     (2022.01)
    *H04L 51/52*     (2022.01)

(56)         References Cited

U.S. PATENT DOCUMENTS

| | | | | |
|---|---|---|---|---|
| 9,563,902 | B2 | 2/2017 | Haswell et al. | |
| 10,037,324 | B1 | 7/2018 | Fontaine | |
| 10,242,114 | B2 | 3/2019 | Mansour et al. | |
| 10,459,997 | B1 | 10/2019 | Agarwal et al. | |
| 10,586,215 | B2 | 3/2020 | Narayanan et al. | |
| 10,719,779 | B1 | 7/2020 | Sagduyu et al. | |
| 2008/0120558 | A1* | 5/2008 | Nathan | A63F 13/352 |
| | | | | 715/764 |
| 2010/0156909 | A1* | 6/2010 | Banerjee | A63F 13/12 |
| | | | | 345/469.1 |
| 2010/0174709 | A1 | 7/2010 | Hansen et al. | |
| 2013/0318014 | A1 | 11/2013 | Ismalon | |
| 2014/0330548 | A1* | 11/2014 | Appel | G06Q 30/0201 |
| | | | | 703/6 |
| 2017/0124772 | A1* | 5/2017 | Baszucki | G06T 15/04 |
| 2018/0060439 | A1 | 3/2018 | Kula et al. | |
| 2018/0158231 | A1* | 6/2018 | Hellam | G06T 15/04 |
| 2018/0350144 | A1* | 12/2018 | Rathod | H04L 51/10 |
| 2019/0205481 | A1 | 7/2019 | Gutnik et al. | |
| 2020/0372017 | A1 | 11/2020 | Gross | |
| 2022/0114787 | A1* | 4/2022 | Loodin Ek | A63F 13/63 |
| 2022/0210514 | A1* | 6/2022 | McBeth | H04N 21/44226 |

OTHER PUBLICATIONS

International Search Report and Written Opinion issued in Application Serial No. PCT/US2022/031145 on Sep. 13, 2022.
International Search Report and Written Opinion issued in Application Serial No. PCT/US2022/031134 on Oct. 5, 2022.
Final Office Action issued in the related U.S. Appl. No. 17/825,608 on Oct. 16, 2023.
Non-Final Office Action issued in related U.S. Appl. No. 17/825,608 on Jun. 10, 2024.
Extended European Search Report and Search Opinion issued in related Application Serial No. 22812167.9 on Jan. 23, 2025.
Beskow et al., "Agent Based Simulation of Bot Disinformation Maneuvers in Twitter", Proceedings of the 2019 Wintre Simulation Conference, Dec. 8, 2019, pp. 750-761.
Extended European Search Report issued in related Application Serial No. 22812162.0 on May 2, 2025.
Notice of Allowance issued in related U.S. Appl. No. 17/825,608 on Aug. 12, 2025.
Notice of Allowance issued in related U.S. Appl. No. 17/825,608 on Aug. 27, 2025.
Supplementary European Office Action issued in related Application Serial No. 22812162.0 on May 20, 2025.
Intention to grant issued in related Application Serial No 22812162.0 on Mar. 26, 2026.

* cited by examiner

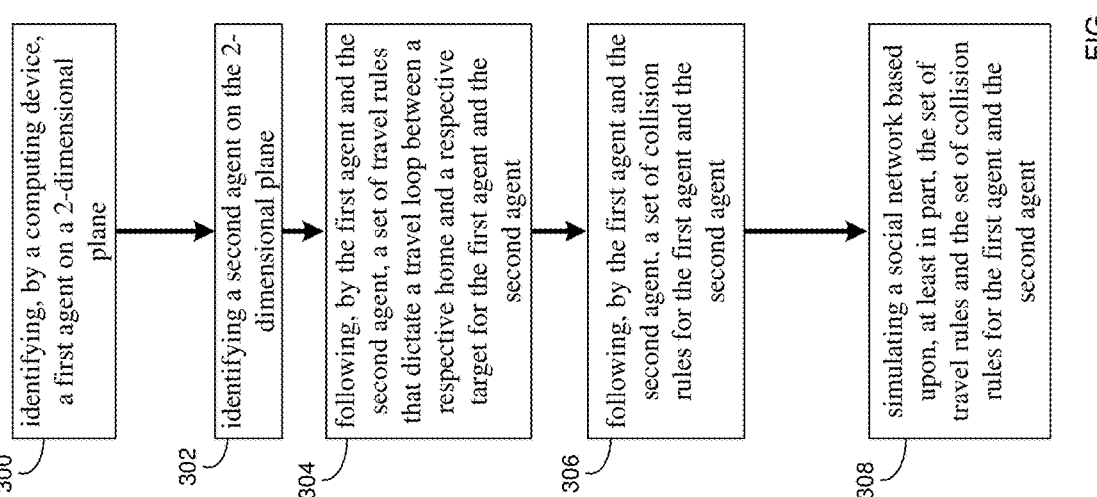

300 — identifying, by a computing device, a first agent on a 2-dimensional plane 302 — identifying a second agent on the 2-dimensional plane 304 — following, by the first agent and the second agent, a set of travel rules that dictate a travel loop between a respective home and a respective target for the first agent and the second agent 306 — following, by the first agent and the second agent, a set of collision rules for the first agent and the second agent 308 — simulating a social network based upon, at least in part, the set of travel rules and the set of collision rules for the first agent and the second agent

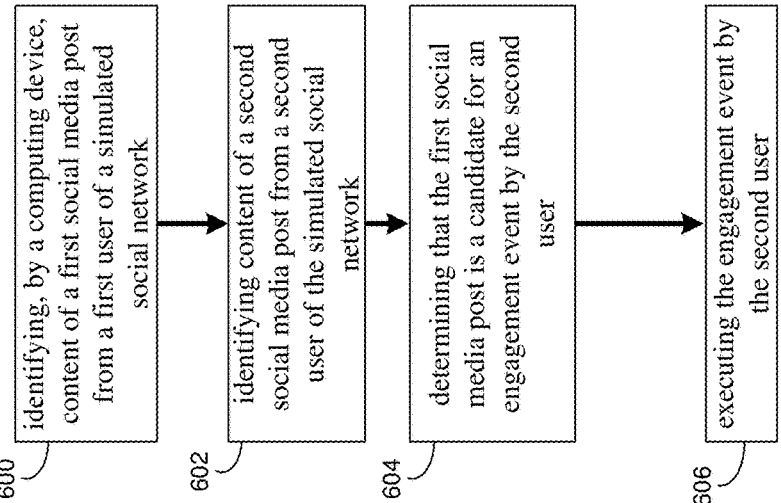

600 — identifying, by a computing device, content of a first social media post from a first user of a simulated social network 602 — identifying content of a second social media post from a second user of the simulated social network 604 — determining that the first social media post is a candidate for an engagement event by the second user 606 — executing the engagement event by the second user

SYSTEMS AND METHODS FOR AUTOMATIC GENERATION OF SOCIAL MEDIA NETWORKS AND INTERACTIONS

RELATED CASES

This application claims the benefit of U.S. Provisional Application No. 63/193,180, filed on 26 May 2021, the contents of which are all incorporated by reference.

BACKGROUND

Automatic content generation may be useful for diverse organizations including the federal government and those from private sectors. Aside from generating content, being able recreate how social media users interact, via actions such as "likes" and "retweets", may have a wide variety of applications in the digital era.

BRIEF SUMMARY OF DISCLOSURE

In one example implementation, a method, performed by one or more computing devices, may include but is not limited to identifying, by a computing device, a first agent on a 2-dimensional plane. A second agent on the 2-dimensional plane may be identified. The first agent and the second agent may follow a set of travel rules that dictate a travel loop between a respective home and a respective target for the first agent and the second agent. The first agent and the second agent may follow a set of collision rules for the first agent and the second agent. A social network may be simulated based upon, at least in part, the set of travel rules and the set of collision rules for the first agent and the second agent.

One or more of the following example features may be included. A topology of the social network may be simulated on the 2-dimensional plane using encoded spatial information. A topology of the social network may be simulated on the 2-dimensional plane using local gravity for re-adjusting a respective home position of the first agent and the second agent. A topology of the social network may be simulated on the 2-dimensional plane using global gravity for re-adjusting a respective home position of the first agent and the second agent. A topology of the social network may be simulated on the 2-dimensional plane using a rate at which followers are acquired by the first agent and the second agent. A topology of the social network may be simulated on the 2-dimensional plane using a range that determines a neighborhood of the first agent and the second agent. A topology of the social network may be simulated on the 2-dimensional plane using an influence of a follower count on how far the first agent and the second agent are allowed to travel.

In another example implementation, a computing system may include one or more processors and one or more memories configured to perform operations that may include but are not limited to identifying a first agent on a 2-dimensional plane. A second agent on the 2-dimensional plane may be identified. The first agent and the second agent may follow a set of travel rules that dictate a travel loop between a respective home and a respective target for the first agent and the second agent. The first agent and the second agent may follow a set of collision rules for the first agent and the second agent. A social network may be simulated based upon, at least in part, the set of travel rules and the set of collision rules for the first agent and the second agent.

One or more of the following example features may be included. A topology of the social network may be simulated on the 2-dimensional plane using encoded spatial information. A topology of the social network may be simulated on the 2-dimensional plane using local gravity for re-adjusting a respective home position of the first agent and the second agent. A topology of the social network may be simulated on the 2-dimensional plane using global gravity for re-adjusting a respective home position of the first agent and the second agent. A topology of the social network may be simulated on the 2-dimensional plane using a rate at which followers are acquired by the first agent and the second agent. A topology of the social network may be simulated on the 2-dimensional plane using a range that determines a neighborhood of the first agent and the second agent. A topology of the social network may be simulated on the 2-dimensional plane using an influence of a follower count on how far the first agent and the second agent are allowed to travel.

In another example implementation, a computer program product may reside on a computer readable storage medium having a plurality of instructions stored thereon which, when executed across one or more processors, may cause at least a portion of the one or more processors to perform operations that may include but are not limited to identifying a first agent on a 2-dimensional plane. A second agent on the 2-dimensional plane may be identified. The first agent and the second agent may follow a set of travel rules that dictate a travel loop between a respective home and a respective target for the first agent and the second agent. The first agent and the second agent may follow a set of collision rules for the first agent and the second agent. A social network may be simulated based upon, at least in part, the set of travel rules and the set of collision rules for the first agent and the second agent.

One or more of the following example features may be included. A topology of the social network may be simulated on the 2-dimensional plane using encoded spatial information. A topology of the social network may be simulated on the 2-dimensional plane using local gravity for re-adjusting a respective home position of the first agent and the second agent. A topology of the social network may be simulated on the 2-dimensional plane using global gravity for re-adjusting a respective home position of the first agent and the second agent. A topology of the social network may be simulated on the 2-dimensional plane using a rate at which followers are acquired by the first agent and the second agent. A topology of the social network may be simulated on the 2-dimensional plane using a range that determines a neighborhood of the first agent and the second agent. A topology of the social network may be simulated on the 2-dimensional plane using an influence of a follower count on how far the first agent and the second agent are allowed to travel.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

3

Figure 1:
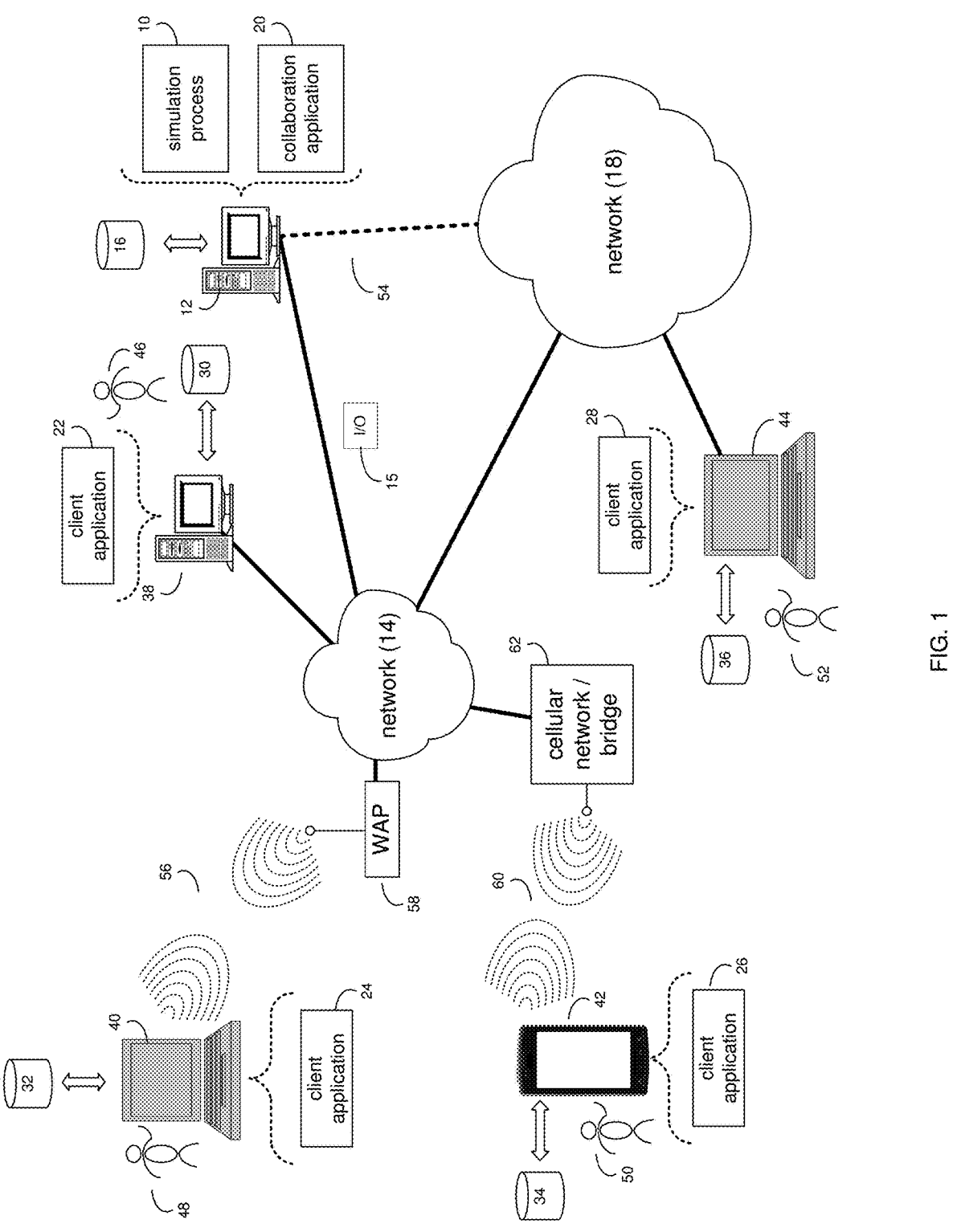
FIG. 1 is an example diagrammatic view of a simulation process coupled to an example distributed computing network according to one or more example implementations of the disclosure.
Figure 2:
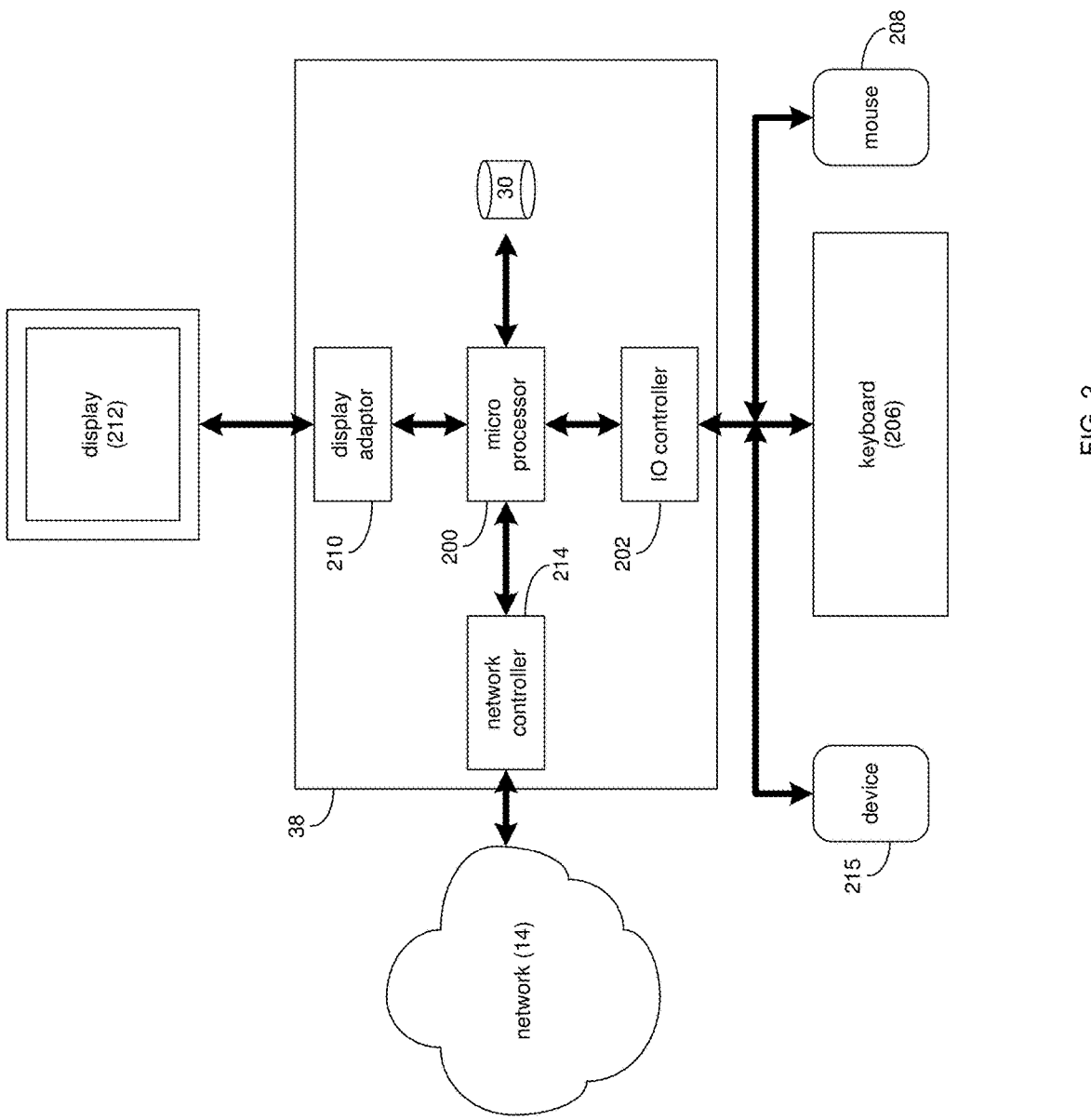
Figure 4:
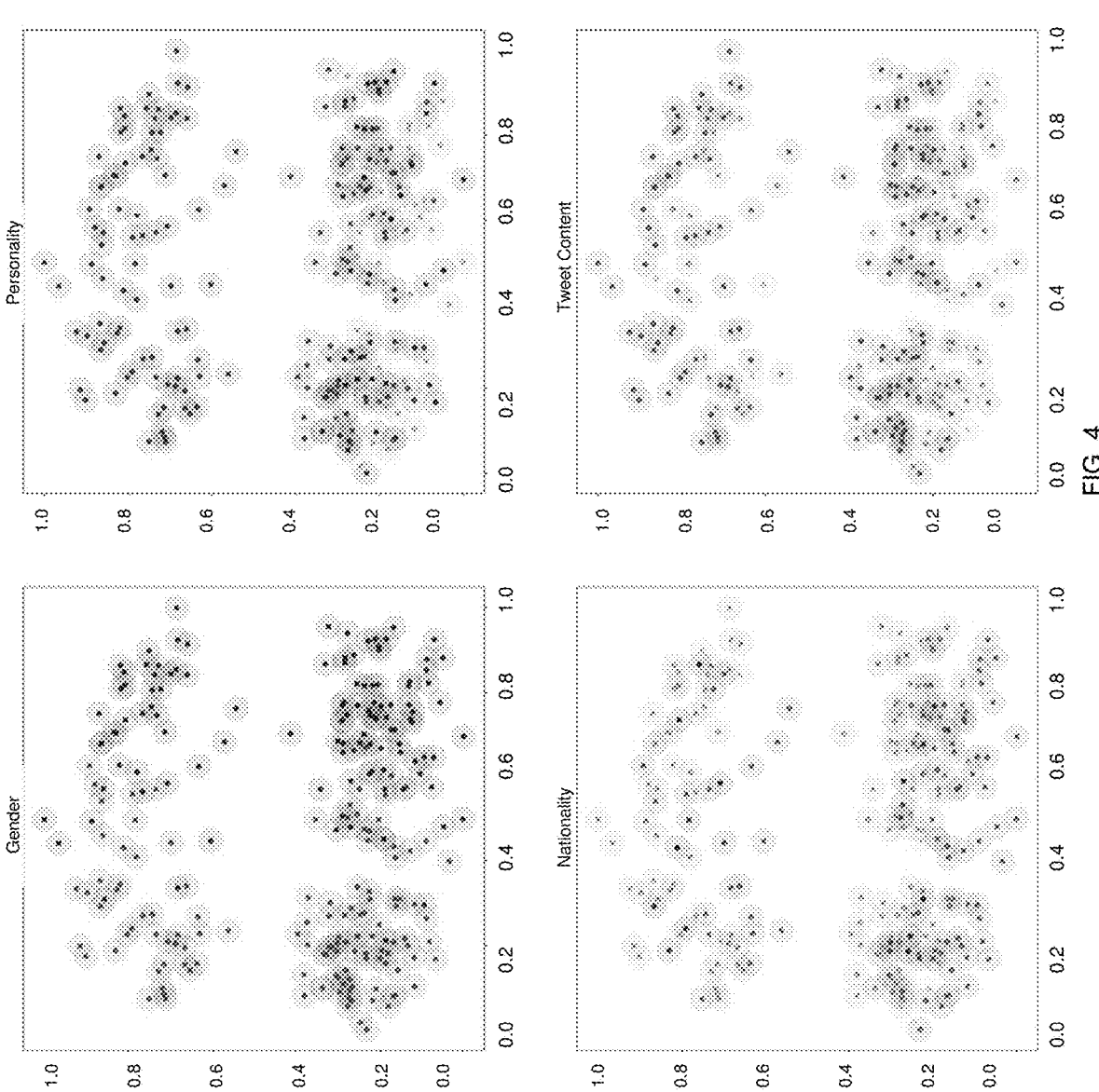
Figure 5:
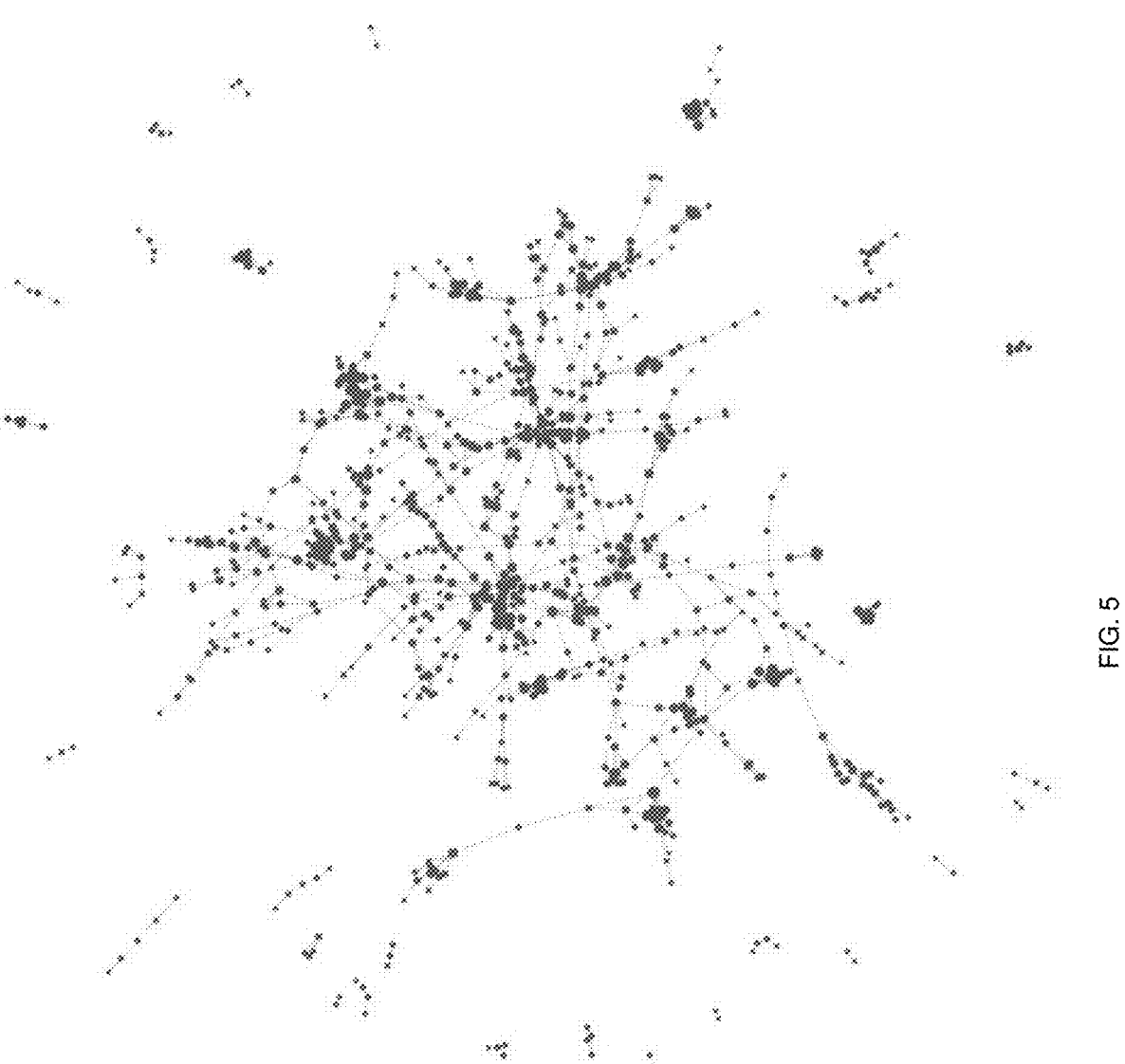
Figure 7:
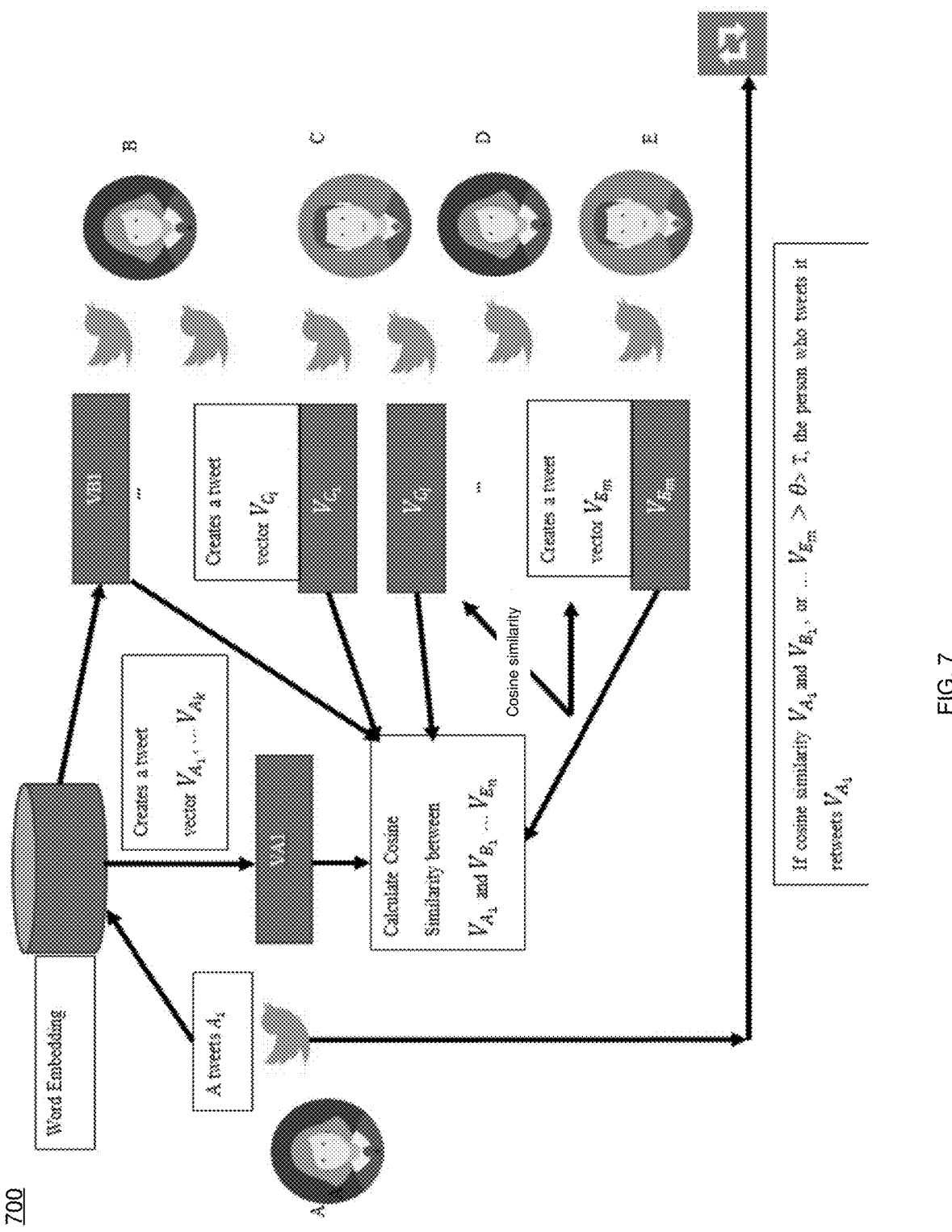

FIG. 2 is an example diagrammatic view of a client electronic device of FIG. 1 according to one or more example implementations of the disclosure;

FIG. 3 is an example flowchart of a simulation process according to one or more example implementations of the disclosure;

FIG. 4 is an example diagrammatic view of a 2-dimensional plane showing agent position arrangement and segmentation simulated by a simulation process according to one or more example implementations of the disclosure;

FIG. 5 is an example diagrammatic view of an output of a simulated social network as generated based on agent-based modeling of a simulation process according to one or more example implementations of the disclosure;

FIG. 6 is an example alternative view of a flowchart of a simulation process according to one or more example implementations of the disclosure; and FIG. 7 is an example alternative view of a flowchart of a simulation process according to one or more example implementations of the disclosure.

Like reference symbols in the various drawings may indicate like elements.

DETAILED DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a body area network BAN), a personal area network (PAN), a metropolitan area network (MAN), etc., or the connection may be made to an external computer (for example, through the internet using an Internet Service Provider). In some implementations, electronic circuitry including, for example, programmable logic circuitry, an application specific integrated circuit (ASIC), field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown simulation process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). A SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a simulation process, such as simulation process 10 of FIG. 1, may identify, by a computing device, a first agent on a 2-dimensional plane. A second agent on the 2-dimensional plane may be identified. The first agent and the second agent may follow a set of travel rules that dictate a travel loop between a respective home and a respective target for the first agent and the second agent. The first agent and the second agent may follow a set of collision rules for the first agent and the second agent. A social network may be simulated based upon, at least in part, the set of travel rules and the set of collision rules for the first agent and the second agent.

In some implementations, as will also be discussed below in greater detail, a simulation process, such as simulation process 10 of FIG. 1, may identify, by a computing device, content of a first social media post from a first user of a simulated social network. Content of a second social media post from a second user of the simulated social network may be identified. It may be determined that the first social media post is a candidate for an engagement event by the second user. The engagement event may be executed by the second user.

In some implementations, the instruction sets and subroutines of simulation process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, simulation process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a collaboration application (e.g., collaboration application 20), examples of which may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, social media application (e.g., Twitter, Facebook, YouTube, Instagram, Snapchat, VK, Sina Weibo, QQ, WeChat, etc.), or other application that allows for virtual meeting and/or remote collaboration. In some implementations, simulation process 10 and/or collaboration application 20 may be accessed via one or more of client applications 22, 24, 26, 28. In some implementations, simulation process 10 may be a standalone application, or may be an applet/application/script/extension that may interact with and/or be executed within collaboration application 20, a component of collaboration application 20, and/or one or more of client applications 22, 24, 26, 28. In some implementations, collaboration application 20 may be a standalone application, or may be an applet/application/script/extension that may interact with and/or be executed within simulation process 10, a component of simulation process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of simulation process 10 and/or collaboration application 20. Examples of client applications 22, 24, 26, 28 may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, social media application (e.g., Twitter, Facebook, YouTube, Instagram, Snapchat, VK, Sina Weibo, QQ, WeChat, etc.), or other application that allows for virtual meeting and/or remote collaboration, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone (such as those embedded within eyeglasses, smart phones, tablet computers and/or watches, etc.), and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of simulation process 10 (and vice versa). Accordingly, in some implementations, simulation process 10 may be a purely server-side application, a purely client-side application, or a hybrid server-side/client-side application that is cooperatively executed by one or more of client applications 22, 24, 26, 28 and/or simulation process 10.

In some implementations, one or more of client applications 22, 24, 26, 28 may be configured to effectuate some or all of the functionality of collaboration application 20 (and vice versa). Accordingly, in some implementations, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, simulation process 10, and collaboration application 20, taken singly or in any combination, may effectuate some or all of the same functionality, any description of effectuating such functionality via one or more of client applications 22, 24, 26, 28, simulation process 10, collaboration application 20, or combination thereof, and any described interaction(s) between one or more of client applications 22, 24, 26, 28, simulation process 10, collaboration application 20, or combination thereof to effectuate such functionality, should be taken as an example only and not to limit the scope of the disclosure.

In some implementations, one or more of users 46, 48, 50, 52 may access computer 12 and simulation process 10 (e.g., using one or more of client electronic devices 38, 40, 42, 44) directly through network 14 or through secondary network 18. Further, computer 12 may be connected to network 14 through secondary network 18, as illustrated with phantom link line 54. Simulation process 10 may include one or more user interfaces, such as browsers and textual or graphical user interfaces, through which users 46, 48, 50, 52 may access simulation process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12 (and vice versa). Examples of I/O request 15 may include but are not limited to, data write requests (e.g., a request that content be written to computer 12) and data read requests (e.g., a request that content be read from computer 12).

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, simulation process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As discussed above, automatic content generation may be useful for diverse organizations including the federal government and those from private sectors. Aside from generating content, being able recreate how social media users interact, via actions such as "likes" and "retweets", may have a wide variety of applications in the digital era. Despite having advanced greatly during the past decade, current Artificial Intelligence (AI) technologies may still be far from ideal and well short of understanding the complex decision-making process of human beings. While modern machine learning may be adept at solving well-scoped problems, example and non-limiting open-ended problems such as those described herein largely remain a challenge. As will be discussed in greater detail below, the present disclosure may address at least two aspects of social media content generation that may be relatively open-ended: social network generation and social engagements including but not limited to "Likes", "Retweets", "Follows" interactions on the popular social media platform Twitter. Social network generation may be considered a form of social engagement, as a stable but growing social network is another way of expressing the Follows interactions.

Regarding social network generation, typically, social networks may be represented as directed or undirected graphs where nodes represent people and edges represent their interpersonal relationships. Synthesizing social networks from scratch with a degree of realism may be a challenging task given the many moving parts involved. Assessing whether a synthetic social network resembles the real thing may be another challenge in itself. Modern approaches are highly varied based on different schools of thought due to the open nature of the problem and the lack of a standardized evaluation method. The present disclosure described herein may involve a social network generation method based on agent-based modeling to simulate the organic growth of online social networks from scratch. Agent-based modeling, such as described in Macal & North, 2009; De Caux, Smith, Kniveton, Black, & Philippides, 2014, may generally be described as a simulation-based methodology that has been applied in various fields including economics, sociology, biology. In epidemiology, it has been used to track the spread of viruses and diseases. The application of agent-based modeling to social network generation as described in this manuscript results in the generation of a social network with statistical measures that are comparable to what is observed in the real world. These measures may include clustering co-efficient, mean shortest path length, and Gini-index score of incoming links. Moreover, the present disclosure may describe a method for incorporating individual demographic information such as gender and nationality, personality type, and personal topics of interest (i.e., "meta-information"), when available, as needed, to the network generation process.

Regarding social media engagement generation, automatic generation of "likes" and "retweets" may be an important part of the content creation process aside from generating the personas (e.g., agents or users) and content (e.g., tweets, posts, comments, etc.). An example of persona generation may be described in U.S. patent application Ser. No. 17/524,485, filed on 11 Nov. 2021, titled Systems and Methods for Automatic Persona Generation from Content and Association with Contents, the contents of which are hereby incorporated by reference herein. For brevity, these types of social interactions with existing content may be referred to as "social engagements", or simply engagements, as this is the established term used by popular social media platforms including Facebook and Twitter. Generation of engagements beyond the personas and their published contents allows for a more robust and dynamic simulation of online social platforms. By its nature, social media content is not generally well written. In Twitter, for example, each tweet is short (initially limited to 140 characters for each tweet, now limited at 280 characters) and prone to typos. Hence, it is not easy to infer the relationship between an original tweet and corresponding responses such as retweets/likes even when the characteristics of the original writers and responders are carefully examined. In other words, there are many contributing factors, as well as sources of noise, that makes it inherently difficult to model the course of events leading to a like or retweet event.

It will be appreciated that engagement may also include posting, deleting posts, liking content, unliking content, commenting, deleting comments, etc.). Social media networks may include but are not limited to, e.g.: major social media platforms (e.g., Twitter, Facebook, YouTube, Instagram, Snapchat, VK, Sina Weibo, QQ, WeChat, etc.), blogs, email, peer-to-peer messaging (e.g.: Internet Relay Chat, XMPP), deep web applications (those not indexed by search engines), dark web applications (e.g., illicit websites on the Tor network), online news media, government and NGO websites, crowdfunding websites, auction websites, massively multiplayer online video games, domain name system (DNS), virtualized internet backbone infrastructure, etc. As such, the use of Twitter or "likes" and "follows" should be taken as example only and not to otherwise limit the scope of the present disclosure.

The Simulation Process:

As discussed above and referring also at least to the example implementations of FIGS. 3-7, simulation process 10 may identify 300, by a computing device, a first agent on a 2-dimensional plane. Simulation process 10 may identify 302 a second agent on the 2-dimensional plane. Simulation process 10 may have the first agent and the second agent follow 304 a set of travel rules that dictate a travel loop between a respective home and a respective target for the first agent and the second agent. Simulation process 10 may have the first agent and the second agent follow 306 a set of collision rules for the first agent and the second agent. Simulation process 10 may simulate 308 a social network based upon, at least in part, the set of travel rules and the set of collision rules for the first agent and the second agent.

In some implementations, simulation process 10 may identify 300, by a computing device, a first agent on a 2-dimensional plane, and in some implementations, simulation process 10 may identify 302 a second agent on the 2-dimensional plane. For example, simulation process 10 may generally be described in three parts: generating the (simulated) social network, integrating demographic information, and generating social engagements for the simulated social network. Regarding generation of the simulated social network, a spatial simulation may be involved and simulation process 10 may presume that social connections between users are directed (i.e., in each relationship, one identified agent is a follower and the other identified agent is a followee). In some implementations, agents may be represented by particles on a 2-dimensional Euclidean plane. An example implementation of a 2-dimensional plane (e.g., 2-dimensional Euclidean plane 400) is shown in the example implementation of FIG. 4. FIG. 4 shows agent position arrangement and segmentation (prior to normalization). In some implementations, simulation process 10 may take agent information, including, e.g., gender, nationality, personality type, and social media content information, and project it to a 2-dimensional feature space (e.g., 2-dimensional Euclidean plane 400) that may be used as initial agent positions identified in the simulation. Notably, the particular locations of each agent (shown as dots) in FIG. 4 itself is not needed to understand to concepts of the present disclosure, and as such, FIG. 4 is not shown in detail.

In some implementations, simulation process 10 may generate personas automatically from textual contents, including, e.g., Tweets, Facebook conversation and other various types of online conversation (e.g., blog posts, articles, etc.) or social media. In some implementations, simulation process 10 may look at each post (e.g., a Tweet, a Facebook post, etc.) as a unit and may infer (as example only) Big-5 personality, gender, country and/or political affiliation from each textual unit. After inferring these features from input texts (which may be tens of thousands of Tweets or Facebook conversations), the analysis process may classify those, generating the most representative personas for the input texts. Thus, each output persona may have these example and non-limiting characteristics: Big-5 personality (e.g., Neuroticism, Extraversion, Openness, Agreeableness, Conscientiousness), gender, country, and/or political affiliation. The idea of inferring personas is to calculate the similarity of words in each post and representative words of Big-5 personality (or country and affiliation, etc.) using, e.g., Word Embedding and choose the highest personality (or country and affiliation, etc.). Word Embedding, generally, is a Machine Learning model that has been trained by a large set of text and learned all the similarities between words. More on this process may be found in U.S. patent application Ser. No. 17/524,485, filed on 11 Nov. 2021, titled Systems and Methods for Automatic Persona Generation from Content and Association with Contents, the contents of which are hereby incorporated by reference herein.

As will be discussed further below, agents may follow a travel routine that dictate their position at each time step; each time two agent collides, a chain of events occurs that impacts their routine and forms potential network connections.

In some implementations, simulation process 10 may have the first agent and the second agent follow 304 a set of travel rules that dictate a travel loop between a respective home and a respective target for the first agent and the second agent, and in some implementations, simulation process 10 may have the first agent and the second agent follow 306 a set of collision rules for the first agent and the second agent. In some implementations, simulation process 10 may simulate 308 a social network based upon, at least in part, the set of travel rules and the set of collision rules for the first agent and the second agent. For example, simulation process 10 may have agents follow 304 a set of travel rules that dictate where they move at each time step on the 2-dimensional plane. A set of collision rules may determine the outcome of each collision of agents on the 2-dimensional plane. In some implementations, travel rules and collision rules may be accessible by simulation process 10 via, e.g., storage device 16 in FIG. 1.

Regarding travel rules, each simulated agent may have in memory a home position and a target position. The core travel rules may dictate that each agent begin at their respective home position/location, move towards their respective target position/location, and then back to the home position/location. Once the agent has returned home, a new target position may be randomly chosen (within a computed range, as described further below), and the cycle may repeat. This constitutes the basic travel loop. When agents collide, two events may occur that may lead to interesting effects. First, for example, when an agent collides with another, whether they are on course to the home or to the current target position, a new target position within range of their current position may be chosen by simulation process 10. They then may immediately begin moving towards the new target position (at the same time forgetting the old target position). Thus, chains of collision may result in an agent moving well beyond their home location.

Second, two agents colliding may have their homes moved closer together by simulation process 10. Thus, there may be a gravitation effect that causes particles, representing agents, to cluster together. This type of agent-based modeling may be intended to simulate the real-life, everyday routine of the average person. That is, for example, a typical person may wake up in the morning, travel to various location to fulfill various goals including but not limited to occupational duties, personal errands, and leisure activities. In the process, they interact with others, which may lead to new contacts or emergent tasks. At the end of the day, they return home. While lower-level simulations may be highly simplistic, they may lead to complex high-level phenomena and may be successfully applied in epidemiology to track the spread of contagious diseases. Online social interactions are arguably similar to how people interact offline; instead of physical locations, people in the online world traverse between different websites and social media platforms, which may be simulated according to one or more aspects of the present disclosure.

In some implementations, when agents collide, there is a probability for one or both agents to acquire another agent as a "follower". A follower, in terms of social networks, should be interpreted in its generally understood meaning (e.g., if agent A is being followed by agent B, then agent B may see updates from agent A in agent B's feed). The chance of acquisition is based on relative and local "influence", which is defined by how many followers one agent already has with respect to the other and with respect to others in the vicinity, respectively. In other words, the more followers an agent has, the more likely that agent is to obtain new followers. This leads to a higher Gini-index score (although other index scores may also be used) when measuring distributional imbalances, which resembles real-world social networks that typically follow a power-law distribution in terms of connection concentration. In the case when agent A collides with agent B, who already is a follower of agent A, there is a chance for agent A to acquire followers of agent B. This "transitive linking" approach also contributes to a higher Gini-index score. A successful acquisition leads to the formation of a new edge in the social network graph being generated, which corresponds to a new "follow" relationship between the two users. An example final output of the simulated social network graph (e.g., simulated network 500) as generated based on agent-based modeling is shown in the example implementation of FIG. 5.

In some implementations, simulation process 10 may integrate agent demographic and other information into the simulation. For instance, thus far, the present disclosure has described a simulation process capable of generating a social network from scratch that results in a set of desirable network statistics. However, the simulation process may assume agents are indistinguishable and mutually interchangeable, while in the real world, agents represent individuals from diverse backgrounds with unique interests that affect how their social connections are formed. By introducing agent information into the rules of the simulation, and thus altering the way the network generator portion of simulation process 10 fundamentally operates, there may be an unpredictable network topology. Moreover, this may result in a hard-encoding of the information that may not be complete and available for all agents. Instead, this information may be introduced by simulation process 10 encoding it as spatial information. Agents from similar demographic backgrounds with similar interests may be more likely to form social connections than those with different backgrounds. Thus, agents may be arranged on the 2-dimensional (2D) plane (i.e., the placement of their home positions) based on the degree of similarity they are with respect to one another. The spatial aspect, in this example, does not represent geographical distance, which is more or less immaterial in the context of online social networks. Instead, the spatial distance represents differences among several dimensions (and personas) including, e.g., cultural background, social and political interests, and life experiences.

For example, consider three hypothetical people: person A is an American man with interests in soccer and sci-fi novels; is a high school graduate; and subscribes to far-right political ideologies. Suppose person B is a British woman with interests in firearms and poetry; is a college graduate; and is generally apolitical. And suppose person C is a Latvian man with interests in horse riding and firearms; is a college graduate; and subscribes to far-left political ideologies. These people are similar and different along various dimensions. Persons A and B are very close culturally given the shared language and historically similar culture—and both have an interest in the literary arts. Persons A and C have different education backgrounds and differ vastly in terms of their political views—they are almost diametrically opposed. Persons B and C share similar education statuses and interests in firearms. Their respective gender and age may also inform mutual similarities and differences in terms of life experiences. The spatial distance between these individuals may be a summation of their differences along these dimensions weighted by the importance of each dimension. From a brief analysis, it may be arguable that person A and B should be placed close to each other, while person C should be placed far from both A and B but relatively closer to B than A to reflect these abstract differences.

In some implementations, a topology of the social network may be simulated on the 2-dimensional plane using encoded spatial information. For instance, in some implementations, simulation process 10 may encode agent personas in a step that translates demographic information into spatial coordinates such that personas are segmented based on their various attributes, and that similar agents are closer to each other in this space as measured by, e.g., Euclidean distance, although other methods of measurement may also be used. Simulation process 10 may be extensible to any type or number of attributes. Herein, three example and non-limiting attributes may include, e.g., gender, nationality, and personality type. Other examples of attributes of varying importance may include but are not limited to age, language and dialect, educational status, income class, marital status, health conditions, and household size. These attributes may be categorical, i.e., selected from a set of mutually exclusive categories, and may typically be encoded via simple one-hot encoding or other techniques. Non-discrete attributes that may include social media content, i.e., the collection of a user's published tweets, may be introduced by simulation process 10 via vector embeddings (typically of length 100-300) to reflect the type of content the user is expected to have interest in. This vector embedding, as a summary of the agent's social media content, may be facilitated by what is known as a distributed vector representation. In other words, this attribute, represented by vector w, captures the distribution of concepts relevant to the interests of the user agent. The entire list of attributes may be encoded as a dense feature vector representation; this is akin to feature extraction in classical machine learning. The categorical attributes may be converted to one-hot encodings, and then concatenated together to form vector v. As the content representation w is already in vector representation form, no additional processing is needed. In this framework, an agent is represented by the concatenated feature vector $[v; w] \in \mathbb{R}^m$.

Once this process is complete for each agent in the population of size n, a persona-feature matrix $M \in R^{n \times m}$ is formed, where each row is a feature vector representing the corresponding agent. Simulation process 10 may then apply an example technique called Principal Component Analysis to project this data to a lower dimension that can be used to initialize the social network generator. That is, simulation process 10 may project it from m-dimensional space to 2-dimensional space; concretely, the output is $M' \in R^{n \times 2}$ where $M' = f(M)$ and $f$ is an abstract PCA function that reduces m-dimensional data to 2-dimensional data. This is a natural way of segmenting the data, on a 2D Euclidean plane, along various attributes and arrange them in a way such that agents with similar profiles are closer to each other and thus more likely to form social connections. There may then be a normalizing step that uses gravity-like mechanisms to obtain a more uniform spacing among each agent by pushing agents away from one another. An example of this process at various stages is shown in FIG. 4.

In some implementations, when agent information is available, simulation process 10 described above may be used to obtain initial starting points for each agent. Regarding the simulation process by which the social network is generated, as noted above, in some implementations, a topology of the social network may be simulated on the 2-dimensional plane using local gravity for re-adjusting a respective home position of the first agent and the second agent, the topology of the social network may be simulated on the 2-dimensional plane using global gravity for re-adjusting a respective home position of the first agent and the second agent, the topology of the social network may be simulated on the 2-dimensional plane using a rate at which followers are acquired by the first agent and the second agent, the topology of the social network may be simulated on the 2-dimensional plane using a range that determines a neighborhood of the first agent and the second agent, and the topology of the social network may be simulated on the 2-dimensional plane using an influence of a follower count on how far the first agent and the second agent are allowed to travel. For example, the core social network generator of simulation process 10 may be parameterized by, e.g., a plurality of variables that may determine the topology of the generated simulated social network. These may be, e.g.: $\alpha$, which controls local gravity when re-adjusting agent home positions; $\beta$, which controls global gravity when re-adjusting agent home positions; $\gamma$, which controls the rate at which followers are acquired; $\lambda$, which controls the range of what is considered the neighborhood; and $\mu$, which controls the influence of follower count on how far an agent can travel. While these five variables constitute the base algorithm, more or less parameters may be used to attain a more fine-grained levels of control over the simulation process and outcome.

In some implementations, as noted above, each agent may have in memory a home position and a target position. The home position and the starting position may be the same initially. This corresponds to M' when this information is available; when this information is not available, agents' positions may be initialized by simulation process 10 sampling values in [0,1] from a uniform distribution and mapped to size of the bound box ("world bounds") that determines where agents can move. Agents may begin at their respective home position, move towards their respective target location and back to the home position in a perpetual cycle. A new target location may be chosen by simulation process 10 each time the agent returns to their respective home location. This constitutes the basic travel loop. When an agent collides with another, whether they are on course to the home or to the current target position, a new target position within range of their current position may be chosen by simulation process 10. This new position may decided based on choosing a random direction and a magnitude. This magnitude or distance, denoted as $$x_i^{distance},$$

is a function of $\mu$ and the number of followers an agent has; concretely, $$x_i^{distance} = \frac{-\log(k)}{1 + \mu \times \left| x_i^{followers} \right|}$$

where k is a randomly sampld real number [0,1], i is the current step, and $$x_i^{followers}$$

is the current set of followers for x. In some implementations, this distance may be random value drawn forma negative exponential distribution that is reduced by the number of followers; the more followers an agent has, the lower the potential distance that it will travel leading to a more stable and localized accumulation of cluster. $\mu$ serves as a co-efficient that determines the impact of follower count on the range.

When two agents collide, there are may be two example effects on its trajectory. First, these agents may have their homes moved closer to each other by simulation process 10. For an agent x, the new location $$x_{i+1}^{home}$$

may be defined by $$x_{i+1}^{home} = x_i^{home} + \left( y_i^{home} - x_i^{home} \right) \frac{\alpha}{1 + \beta \times \left| x_i^{followers} \right|}$$

where i is the current time step, $$x_i^{home}$$

is the agent's current home position, $$y_i^{home}$$

is the home position of the other agent in the collision, and $$x_i^{followers}$$

is the agent's current set of followers. α controls the magnitude of this re-adjustment, while β controls the impact of the number of followers on this re-adjustment. In some implementations, the more followers an agent has, the more "mass" it has, and the more resistance it is to this type of gravitational pull effect. Conversely, agents with fewer followers may be more likely to gravitate towards more influential or affluent agents, encouraging a localized clustering effect. Second, agents colliding may, instead of returning home or proceeding towards their current target location, simulation process 10 may choose a new location within the agent's current range and immediately proceed to the new location. Thus, chains of collision may result in an agent moving well beyond their home location and acquiring more remote followers. The snowball effect resulting from this contributes to a more unequal distribution of followers that mimics real-life trending effects.

Next, the follower acquisitions rules are described. These example rules may determine whether or not an agent acquires another agent as a follower. In some implementations, the chance of acquisition may be based on "personal influence" and "local influence", which is defined by how many followers one agent already has with respect to the other and with respect to others in the vicinity, respectively. Personal Influence between the acquiring agent A and another agent v, may be defined as:

$$PI_{x,y} = \frac{\left|x^{followers}\right|}{1 + \left|y^{followers}\right|}$$

On the other hand, Local Influence, is based on the influence of the agent with respect to other agents in the vicinity. Local Influence may then be defined as $$LI_x = \frac{\left|x^{followers}\right|}{1 + \sum_{k \in K^\lambda} \left|k^{followers}\right|}$$

where $K^\lambda$ represents the set of agents within a range of $\lambda$ from agent x. Based on these computed factors, the probably of an agent x acquiring an agent y as a follower is based on the probability $p(x,y)=\gamma PI_{x,y} LI_x$ where $\gamma$ is a parameter of the generator that adjusts the rate of follower acquisition. This probability determines whether an agent x colliding with agent y acquires y as a follower. If y is already a follower of x, then the acquisition check is instead applied to all followers of y. This allows a chance for x to acquire remote but plausible followers via transitive links and contributes to a higher Gini-index. In other words, the more followers an agent has, the more likely that agent is to obtain new followers. FIG. 5, noted above, depicts an example social network generated by this methodology.

As discussed above and referring also at least to the example implementations of FIGS. 3-7, simulation process 10 may identify 600, by a computing device, content of a first social media post from a first user of a simulated social network. Simulation process 10 may identify 602 content of a second social media post from a second user of the simulated social network. Simulation process 10 may determine 604 that the first social media post is a candidate for an engagement event by the second user. Simulation process 10 may execute 606 the engagement event by the second user.

It will be appreciated that while the follow examples may use a reposting engagement event as the engagement event (such as the kind of "retweeting" and "sharing" engagement events commonly known for Twitter and Facebook) other types of engagement events may also be used without departing from the scope of the present disclosure. For example, the engagement event may be a like engagement event (such as the kind of "Like" engagement events commonly known for Twitter and Facebook). As such, the use of retweeting or "Liking" of a post should be taken as example only and not to otherwise limit the scope of the present disclosure.

In some implementations, while this section may be used without requiring the simulated social network described above, simulation process 10 may also generate social engagements for use with the above-described simulated social network. In some implementations, simulation process 10 may provide an example and unique method for extracting the relationship between an existing tweet (or any piece of social media content) and its subsequent engagements, and employ it to generate the proper agent-to-agent interactions in a simulation setting, such as those described above. In some implementations, this approach may revolve around simulation process 10 applying the idea of word embeddings, which may produce an example 100-to-300-dimensional (or similar) vector representation for each word, to extract a list of vectors and generate a resulting vector for each tweet. Simulation process 10 may compare candidate tweets based on the cosine similarities (or other metrics) of the corresponding vectors and determine the similarities by the resulting cosine values (1 for being highly similar to 0 for being dissimilar). For example, consider the following hypothetical tweets: "I watch the Super Bowl mostly for the commercials", "The government welfare program is a joke!", and "I hate Obamacare—it's time to repeal now!" The first tweet is diametrically different from the latter two tweets in terms of sentiment, tone, and topic. Thus, it may be expected that the first tweet has a very low (almost 0) similarity score with respect to the second and third tweets. The second and third tweets are mutually similar in both tone and sentiment and they both share a similar (or adjacent) topic of contention. Thus, it is expected that the second and third tweets have a mutually high similarity score. In some implementations, a person that often tweets about a certain topic, with a similar sentiment, may retweet content that are similar to their own post history. Thresholding of these similarity scores may be used to determine whether a retweet event occurs, between a user and an existing tweet. A similar methodology may be used for generating "like" events in a simulated social network. Social network information, such as those generated in a manner described previously, may be used to extend this method for enhanced realism.

In some implementations, simulation process 10 may use a unique algorithm to extract the relationship between Tweet and retweet/like and employ it to generate proper retweet/like in a simulation setting. An example flowchart of simulation process 10 is shown in the example implementation of FIG. 7, describing an example and non-limiting methodology for generating simulated social engagements such as "retweets" based on tweet relevance as measured by the cosine similarity of corresponding Twitter posts. A similar method may be used for generating "like" interactions. In some implementations, simulation process 10 may use distributed vector representation, described previously, in the form of word embeddings and expand it to cover an entire tweet message (or other type of post). As word embedding may produce a 100-to-300-dimensional vector for each word, simulation process 10 may extract a list of vectors and generate a resulting vector for sentence or even the entire message in each tweet. There are several ways to create tweet vectors from word vectors including, e.g., summing or averaging all the word vectors in the entire tweet. In some implementations, simulation process 10 may compare these tweets by their cosine similarities of the corresponding vectors and determine the similarities of original Tweets by the resulting cosign values (e.g., 1 for being highly similar to 0 for being dissimilar).

For instance, in some implementations, the first social media post may be determined to be the candidate for the engagement event by the second user based upon a comparison of the content of the first social media post from the first user with the content of the second social media post from the second user, and in some implementations, the first social media post may be determined to be the candidate for the engagement event by the second user based upon a threshold difference between a first vector representation generated for the first social media post and a second vector representation generated for the second social media post. First, and referring again at least to the example implementation of FIG. 7, the example approach for simulation process 10 generating retweets (or other social engagement events) may be described, supposing that a user A posts a tweet $A_1$. Simulation process 10 may need to decide which user among B, C, D, E will retweet $A_1$. Simulation process 10 may calculate the tweet vector for $A_1$, denoted as $V_{A_1}$, and all the Tweet vectors from B, C, D, and E. These correspond to tweets $B_1, \ldots, B_k$ for user B, $C_1, \ldots, C_l$ for C, $\ldots E_n$ and for E. So, these vectors are denoted as for person $V_{B_1}, \ldots, V_{B_k}$, for person B, $V_{C_1}, \ldots, V_{C_l}$ for person C, $\ldots$, and $V_{E_1}, \ldots, V_{E_n}$ for person E. Each user can be summarized as a vector representing a collection of tweets.

In some implementations, the first social media post may be determined to be the candidate for the engagement event by the second user based upon a threshold difference of a cosine similarity between a first vector representation generated for the first social media post and a second vector representation generated for the second social media post. For example, the summary vector for B is $$V_B = \frac{V_{B_1} + \ldots + V_{B_k}}{k}.$$

Thus, we can calculate the relevance of $V_{A_1}$ and to each user by comparing $V_{A_1}$ to $V_B$, $V_C$, $V_D$, $V_E$ via cosine similarity measures. If the cosine similarities of the summation vector from a person $P \in \{B,C,D,E\}$ to $V_{A_1}$ is above a certain threshold $\theta$, then person P is designated to retweet the message $A_1$, which in some implementations, simulation process 10 may execute 606 the engagement event by the second user (simulated agent user) retweeting the message $A_1$ in the simulated social network. Conversely, if the cosine similarities of the summation vector from a person $P \in \{B, C,D,E\}$ to $V_{A_1}$ is less than a certain threshold $\theta$, then person P is not designated to retweet the message $A_1$. It will be appreciated that the combination of word vectors may be determined by any reasonable aggregate function of input vectors, including, e.g., average, summation, or other aggregate functions. As such, the use of summation should be taken as example only and not to otherwise limit the scope of the present disclosure.

In some implementations, the topology of the social network may be simulated on a 2-dimensional plane using encoded spatial information. For instance, as discussed above, simulation process 10 may be expanded by utilizing the social network information when available. Instead of simply calculating cosine similarity between tweet vectors and applying a threshold to decide if a user retweets another tweet, simulation process 10 may use two thresholds. For example, simulation process 10 may use one threshold for people (agents) who are "following" the person, and another threshold for people who are not "following" the person. For instance, if user (agent) B follows user (agent) A, while user (agent) C does not follow user A, the threshold for user B may be lower than for user C, as in the real world, users are more likely to retweet people those users are following. Similarly, in some implementations, the threshold may vary depending on the number of retweets and likes that may exist between two users (agents). The interaction whereby a user "likes" another user's tweet may be generated in a similar fashion using tweet vectors as described above. Simulation process 10 may set different thresholds for liking and retweeting (e.g., threshold for "retweet" may be higher than that for "like" because retweet may sometimes carry a neutral or negative sentiment). Using the same or similar algorithm as explained for retweets, if the cosine similarity between $V_{A_1}$ (tweet vector for $A_1$) and tweet vector of other tweets is higher than the threshold for "like", then the person will like $V_{A_1}$ in the simulation. If the similarity measure is above the like retweet threshold, but below the like threshold, the interaction may instead be a retweet action executed by simulation process 10. In some implementations, "retweet" and "like" may be determined in a mutually exclusive fashion, so that a person will not retweet and like another tweet at the same time.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:

identifying, by a computing device, a first simulated agent on a 2-dimensional plane, wherein the first simulated agent represents a persona of a first person generated using textual content associated with the first person;

identifying a second simulated agent on the 2-dimensional plane, wherein the second simulated agent represents a persona of a second person generated using textual content associated with the second person;

following, by the first simulated agent and the second simulated agent, a set of travel rules that dictate a travel loop within the 2-dimensional plane between a respective home and a respective target for the first simulated agent and the second simulated agent;

following, by the first simulated agent and the second simulated agent, a set of collision rules for the first simulated agent and the second simulated agent, wherein the set of collision rules determine an outcome of a collision between the first simulated agent and the second simulated agent, wherein the set of collision rules define:

an impact on trajectories of each of the first simulated agent and the second simulated agent within the 2-dimensional plane based upon, at least in part, a number of followers for each simulated agent, and a movement in the respective home of each simulated agent within the 2-dimensional plane based upon, at least in part, a number of followers for each simulated agent; and simulating a social network based upon, at least in part, the set of travel rules and the set of collision rules for the first simulated agent and the second simulated agent.

2. The computer-implemented method of claim 1 wherein a topology of the social network is simulated on the 2-dimensional plane using encoded spatial information.

3. The computer-implemented method of claim 1 wherein a topology of the social network is simulated on the 2-dimensional plane using local gravity for re-adjusting a respective home position of the first simulated agent and the second simulated agent.

4. The computer-implemented method of claim 1 wherein a topology of the social network is simulated on the 2-dimensional plane using global gravity for re-adjusting a respective home position of the first simulated agent and the second simulated agent.

5. The computer-implemented method of claim 1 wherein a topology of the social network is simulated on the 2-dimensional plane using a rate at which followers are acquired by the first simulated agent and the second simulated agent.

6. The computer-implemented method of claim 1 wherein a topology of the social network is simulated on the 2-dimensional plane using a range that determines a neighborhood of the first simulated agent and the second simulated agent.

7. The computer-implemented method of claim 1 wherein a topology of the social network is simulated on the 2-dimensional plane using an influence of a follower count on how far the first simulated agent and the second simulated agent are allowed to travel.

8. A computer program product residing on a non-transitory computer readable storage medium having a plurality of instructions stored thereon which, when executed across one or more processors, causes at least a portion of the one or more processors to perform operations comprising:

identifying a first simulated agent on a 2-dimensional plane, wherein the first simulated agent represents a persona of a first person generated using textual content associated with the first person;

identifying a second simulated agent on the 2-dimensional plane, wherein the second simulated agent represents a persona of a second person generated using textual content associated with the second person;

following, by the first simulated agent and the second simulated agent, a set of travel rules that dictate a travel loop within the 2-dimensional plane between a respective home and a respective target for the first simulated agent and the second simulated agent;

following, by the first simulated agent and the second simulated agent, a set of collision rules for the first simulated agent and the second simulated agent, wherein the set of collision rules determine an outcome of a collision between the first simulated agent and the second simulated agent, wherein the set of collision rules define:

an impact on trajectories of each of the first simulated agent and the second simulated agent within the 2-dimensional plane based upon, at least in part, a number of followers for each simulated agent, and a movement in the respective home of each simulated agent within the 2-dimensional plane based upon, at least in part, a number of followers for each simulated agent; and simulating a social network based upon, at least in part, the set of travel rules and the set of collision rules for the first simulated agent and the second simulated agent.

9. The computer program product of claim 8 wherein a topology of the social network is simulated on the 2-dimensional plane using encoded spatial information.

10. The computer program product of claim 8 wherein a topology of the social network is simulated on the 2-dimensional plane using local gravity for re-adjusting a respective home position of the first simulated agent and the second simulated agent.

11. The computer program product of claim 8 wherein a topology of the social network is simulated on the 2-dimensional plane using global gravity for re-adjusting a respective home position of the first simulated agent and the second simulated agent.

12. The computer program product of claim 8 wherein a topology of the social network is simulated on the 2-dimensional plane using a rate at which followers are acquired by the first simulated agent and the second simulated agent.

13. The computer program product of claim 8 wherein a topology of the social network is simulated on the 2-dimensional plane using a range that determines a neighborhood of the first simulated agent and the second simulated agent.

14. The computer program product of claim 8 wherein a topology of the social network is simulated on the 2-dimensional plane using an influence of a follower count on how far the first simulated agent and the second simulated agent are allowed to travel.

15. A computing system including one or more processors and one or more memories configured to perform operations comprising:

identifying a first simulated agent on a 2-dimensional plane, wherein the first simulated agent represents a persona of a first person generated using textual content associated with the first person;

identifying a second simulated agent on the 2-dimensional plane, wherein the second simulated agent represents a persona of a second person generated using textual content associated with the second person;

following, by the first simulated agent and the second simulated agent, a set of travel rules that dictate a travel loop within the 2-dimensional plane between a respective home and a respective target for the first simulated agent and the second simulated agent;

following, by the first simulated agent and the second simulated agent, a set of collision rules for the first simulated agent and the second simulated agent, wherein the set of collision rules determine an outcome of a collision between the first simulated agent and the second simulated agent, wherein the set of collision rules define:

an impact on trajectories of each of the first simulated agent and the second simulated agent within the 2-dimensional plane based upon, at least in part, a number of followers for each simulated agent, and a movement in the respective home of each simulated agent within the 2-dimensional plane based upon, at least in part, a number of followers for each simulated agent; and simulating a social network based upon, at least in part, the set of travel rules and the set of collision rules for the first simulated agent and the second simulated agent.

16. The computing system of claim 15 wherein a topology of the social network is simulated on the 2-dimensional plane using encoded spatial information.

17. The computing system of claim 15 wherein a topology of the social network is simulated on the 2-dimensional plane using local gravity for re-adjusting a respective home position of the first simulated agent and the second simulated agent.

18. The computing system of claim 15 wherein a topology of the social network is simulated on the 2-dimensional plane using global gravity for re-adjusting a respective home position of the first simulated agent and the second simulated agent.

19. The computing system of claim 15 wherein a topology of the social network is simulated on the 2-dimensional plane using a rate at which followers are acquired by the first simulated agent and the second simulated agent.

20. The computing system of claim 15 wherein a topology of the social network is simulated on the 2-dimensional plane using a range that determines a neighborhood of the first simulated agent and the second simulated agent.

21. The computing system of claim 15 wherein a topology of the social network is simulated on the 2-dimensional plane using an influence of a follower count on how far the first simulated agent and the second simulated agent are allowed to travel.

* * * * *